United States Patent
Zhang et al.

(10) Patent No.: US 12,510,195 B1
(45) Date of Patent: Dec. 30, 2025

(54) STEEL WIRE PRE-EMBEDDED INTEGRATED FULL-BORE ACID FRACTURING HOSE ASSEMBLY AND PREPARATION METHOD THEREOF

(71) Applicant: QINGDAO QINGFLEX HOSE FACTORY, Qingdao (CN)

(72) Inventors: Chen Zhang, Qingdao (CN); Yanqiu Wang, Qingdao (CN); Fan Zhou, Qingdao (CN)

(73) Assignee: QINGDAO QINGFLEX HOSE FACTORY, Qingdao (CN)

( * ) Notice: Subject to any disclaimer, the term of this patent is extended or adjusted under 35 U.S.C. 154(b) by 0 days.

(21) Appl. No.: 19/083,351

(22) Filed: Mar. 18, 2025

(30) Foreign Application Priority Data

Jul. 31, 2024 (CN) .......................... 202411034425.4

(51) Int. Cl.
*F16L 33/01* (2006.01)
*F16L 11/08* (2006.01)
*F16L 11/12* (2006.01)
*F16L 33/00* (2006.01)
*F16L 33/22* (2006.01)
*F16L 33/24* (2006.01)
*F16L 33/34* (2006.01)
*E21B 17/08* (2006.01)
*F16L 33/28* (2006.01)

(52) U.S. Cl.
CPC ............. *F16L 33/01* (2013.01); *F16L 11/082* (2013.01); *F16L 11/083* (2013.01); *F16L 11/122* (2013.01); *F16L 33/003* (2013.01); *F16L 33/226* (2013.01); *F16L 33/34* (2013.01); *E21B 17/085* (2013.01); *F16L 33/24* (2013.01); *F16L 33/28* (2013.01)

(58) Field of Classification Search
CPC ........ F16L 11/082; F16L 11/088; F16L 11/10; F16L 33/003; F16L 33/01; F16L 33/10; F16L 33/226; F16L 33/24; F16L 33/28; F16L 33/34
USPC .......... 138/109; 285/222.1, 222.2, 222.4, 404
See application file for complete search history.

(56) References Cited

U.S. PATENT DOCUMENTS 715,641 A * 12/1902 Cronk ..................... F16L 47/24
285/148.13
840,536 A * 1/1907 Weir ....................... F16L 33/01
138/120

(Continued)

*Primary Examiner* — Kenneth Rinehart
*Assistant Examiner* — Richard K. Durden
(74) *Attorney, Agent, or Firm* — IPro, PLLC; Na Xu

(57) ABSTRACT

The present invention provides a steel wire pre-embedded integrated full-bore acid fracturing hose assembly, including a hose that sequentially includes an inner liner, an internal adhesive layer, a steel wire layer, and an external adhesive layer from inside out; and, a joint that includes a protective sleeve disposed between the external adhesive layer and the steel wire layer, a locking sleeve sleeved on an outer side of the internal adhesive layer, and an outer sleeve disposed outside the inner liner, which are sequentially disposed from inside out along an axial direction of the hose; an outer circumferential surface of the locking sleeve is provided with a tooth groove, and a steel wire of the steel wire layer is embedded in the tooth groove and locked; and the outer sleeve is in a threaded connection with the locking sleeve and the protective sleeve.

5 Claims, 8 Drawing Sheets

(56) References Cited

U.S. PATENT DOCUMENTS

| | | | | |
|---|---|---|---|---|
| 2,122,126 A * | 6/1938 | Barnard | F16L 33/003 | 285/222.4 |
| 2,220,785 A * | 11/1940 | Goodall | F16L 33/003 | 285/334.5 |
| 2,371,363 A * | 3/1945 | Smith | F16L 33/222 | 285/222.4 |
| 2,473,441 A * | 6/1949 | Muller | F16L 33/01 | 285/222.2 |
| 2,506,494 A * | 5/1950 | Feiler | F16L 33/003 | 285/91 |
| 2,809,056 A * | 10/1957 | Kaiser | F16L 33/01 | 285/251 |
| 2,853,319 A * | 9/1958 | Press | F16L 33/224 | 285/259 |
| 3,115,353 A * | 12/1963 | Previati | F16L 33/18 | 285/248 |
| 3,531,143 A * | 9/1970 | Sandor | F16L 33/01 | 138/109 |
| 4,033,612 A * | 7/1977 | Chevalier | F16L 33/01 | 285/222.4 |
| 4,143,892 A * | 3/1979 | Murphy | F16L 33/01 | 156/305 |
| 4,372,562 A * | 2/1983 | Carter, Jr. | E21B 33/1277 | 166/120 |
| 4,666,191 A * | 5/1987 | Sotelo | F16L 33/01 | 138/109 |
| 4,813,715 A * | 3/1989 | Policelli | F16L 47/20 | 138/109 |
| 6,315,002 B1 * | 11/2001 | Antal | F16L 33/01 | 138/136 |
| 6,938,932 B2 * | 9/2005 | Grepaly | F16L 33/01 | 285/286.1 |
| 9,587,772 B2 * | 3/2017 | Jaspaert | B29C 66/7394 | |
| 10,066,765 B2 * | 9/2018 | Jaspaert | F16L 39/02 | |
| 10,655,772 B2 * | 5/2020 | Larsen | F16L 11/12 | |
| 11,300,231 B2 * | 4/2022 | Jaspaert | B29C 66/5344 | |
| 2009/0126821 A1 * | 5/2009 | Domonkos | F16L 33/34 | 138/133 |

* cited by examiner

STEEL WIRE PRE-EMBEDDED INTEGRATED FULL-BORE ACID FRACTURING HOSE ASSEMBLY AND PREPARATION METHOD THEREOF

CROSS-REFERENCE TO RELATED APPLICATIONS

The present invention claims priority to Chinese Patent Application No. 202411034425.4, filed with the China National Intellectual Property Administration on Jul. 31, 2024 and entitled "Steel Wire Pre-Embedded Integrated Full-Bore Acid Fracturing Hose Assembly and Preparation Method Thereof", which is incorporated herein by reference in its entirety and constitutes a part of the present invention, for all purposes.

TECHNICAL FIELD

The present invention relates to the field of hose joint technologies, and in particular, to a steel wire pre-embedded integrated full-bore acid fracturing hose assembly and a preparation method thereof.

BACKGROUND

Currently, a buckle joint is mostly used for the acid fracturing hose assembly. Although this structure can satisfy a service requirement under ordinary pressure, in an ultra-high pressure environment, because an inner diameter of the joint is smaller than an inner diameter of the rubber hose, a flow rate is limited. In addition, a stress concentration area is easily formed at the root of the joint, the rubber is seriously worn, and leakage easily occurs. Moreover, the connection strength between the joint and the hose is insufficient, and the joint is pulled out from the hose after a certain time of use.

SUMMARY

In view of the shortcomings of the prior art, embodiments of the present invention aim to provide a steel wire pre-embedded integrated full-bore acid fracturing hose assembly, to increase a working pressure and prolong a service life of the hose, thereby satisfying an urgent requirement of the oil industry for a high-performance hose.

To achieve the foregoing objective, the embodiments of the present invention provide the following technical solutions.

A steel wire pre-embedded integrated full-bore acid fracturing hose assembly, including: a hose and a joint; the hose sequentially including an inner liner layer, an inner rubber layer, a steel wire layer, and an outer rubber layer from inside to outside; the joint including a protective sleeve, a plurality of locking sleeves, and an outer sleeve that are sequentially disposed from inside to outside along an axial direction of the hose; the protective sleeve being disposed between the outer rubber layer and the steel wire layer; the locking sleeves being sleeved on an outer side of the inner rubber layer, an outer diameter of the locking sleeves being greater than an outer diameter of the steel wire layer, an inner end face of the locking sleeves abutting against an outer end face of the protective sleeve, an outer circumferential surface of the locking sleeves being provided with a plurality of tooth grooves, and steel wires of the steel wire layer being embedded in the tooth grooves and locked; and the outer sleeve being disposed outside the inner liner layer, and the outer sleeve being in a threaded connection with the locking sleeves and the protective sleeve.

An embodiment of the present invention further provides a steel wire pre-embedded integrated full-bore acid fracturing hose assembly, including: a hose and a joint; the hose sequentially including an inner liner layer, an inner rubber layer, a steel wire layer, and an outer rubber layer from inside to outside; the joint including a protective sleeve, a plurality of locking sleeves, and an outer sleeve that are sequentially disposed from inside to outside along an axial direction of the hose; the protective sleeve being disposed between the outer rubber layer and the steel wire layer; the locking sleeves being sleeved on an outer side of the inner rubber layer, an outer diameter of the locking sleeves being greater than an outer diameter of the steel wire layer, an inner end face of the locking sleeves abutting against an outer end face of the protective sleeve, an outer circumferential surface of the locking sleeves being provided with a plurality of tooth grooves, and steel wires of the steel wire layer being embedded in the tooth grooves and locked; the outer sleeve being disposed between the inner liner layer and the outer rubber layer, and the outer sleeve being in a threaded connection with the locking sleeves and the protective sleeve; and an outer circumferential surface of the protective sleeve being axially provided with a pyramidal frustum, a conical frustum, and a first externally threaded boss in sequence, a diameter of a large end of the pyramidal frustum being equal to a diameter of the conical frustum and being equal to an outer diameter of the outer sleeve, an end portion of an inner hole of the outer sleeve being provided with a first internally threaded boss, and the first externally threaded boss of the protective sleeve being connected to the first internally threaded boss of the outer sleeve.

An embodiment of the present invention further provides a method for preparing the steel wire pre-embedded integrated full-bore acid fracturing hose assembly, including:

preparing a hose not including an outer rubber layer, and sleeving a protective sleeve on an outer ply layer of the hose;

cutting two outer layers of steel wires, sleeving a first locking sleeve on an inner layer of the steel wires of the hose, embedding the cut outer layers of the steel wires into a plurality of tooth grooves of the first locking sleeve, and locking the outer layers of steel wire by using a set screw;

cutting two inner layers of steel wires, sleeving a second locking sleeve on an inner ply layer of the hose, embedding the cut inner layers of the steel wires into a plurality of tooth grooves of the second locking sleeve, and locking the inner layers of the steel wires by using a set screw;

striping the inner ply layer and an inner rubber layer, remaining an inner liner layer, sleeving an outer sleeve on an outer side of the inner liner layer to be screwed with the second locking sleeve, and bending and squeezing end portions of the inner rubber layer and the inner ply layer between a first sealing groove and a second sealing groove;

screwing a fastening screw into a fastening screw hole of the outer sleeve to abut against the second locking sleeve;

rotating the protective sleeve to be in a threaded connection with the outer sleeve; and coating an outer surface of the protective sleeve with an outer rubber layer, and vulcanizing the outer rubber layer to obtain a finished product.

The one or more technical solutions provided in the embodiments of the present invention have at least the following technical effects or advantages:
1) In the hose assembly, the hose and the joint are integrally formed through vulcanization instead of buckle, to be in a full-bore form, and a flow rate is not limited. The protective sleeve is located at the root of the joint and is located between the outer rubber layer and the steel wire layer of the hose, and performs protection and support functions, to prevent the root connecting the hose and the joint from being excessively bent during use, avoid forming a stress concentration point, prevent the steel wire layer from being deformed or damaged when stressed, and prolong the service life.
2) The outer sleeve is in a threaded connection with the protective sleeve and the locking sleeve, and then the outer rubber layer is vulcanized to an outer side of the hose and the protective sleeve. Through threaded connection and integral vulcanization, a close fit between the hose and the joint is implemented, thereby ensuring sealing and connection strength of the joint. In addition, the steel wires of the steel wire layer is firmly embedded in the tooth grooves of the locking sleeve, and is further locked and fixed, thereby avoiding pull-out of the steel wire, combining the hose and the joint into a more compact whole, and improving connection strength and a pressure-bearing capability.
3) An inner layer of the hose and an inner wall of the outer sleeve share a continuous inner liner layer, so that the joint that is difficult to be vulcanized on the inner side of the inner liner layer is also protected by the inner liner layer, thereby improving performance such as resistance to wear and acid corrosion. In addition, there is no juncture and no weak point between the joint and the hose, thereby ensuring sealing and integrity, and greatly prolonging the service life of the joint.
4) Two layers of steel wire are disposed in each tooth groove, and the two layers of steel wire have opposite directions of rotation. In this arrangement manner, two adjacent layers of steel wire can balance a torsional force when stressed, so that the torsional force can be balanced when the tube body is compressed, and stability and pressure-bearing capability of the hose assembly are further improved.

Advantages of additional aspects of the present invention will be set forth in the following description, and will become apparent in part from the following description, or may be learned from practice of the present invention.

BRIEF DESCRIPTION OF THE DRAWINGS

To describe technical solutions in embodiments of this application or in the prior art more clearly, the following briefly describes accompanying drawings required for describing the embodiments or the prior art. Apparently, the accompanying drawings in the following description show merely some embodiments in this application, and a person of ordinary skill in the art may still derive other drawings from these accompanying drawings without creative efforts. In addition, the spacing or size between each other is exaggerated to show the position of each part, and the schematic diagram is merely used for illustration.

Figure 1:
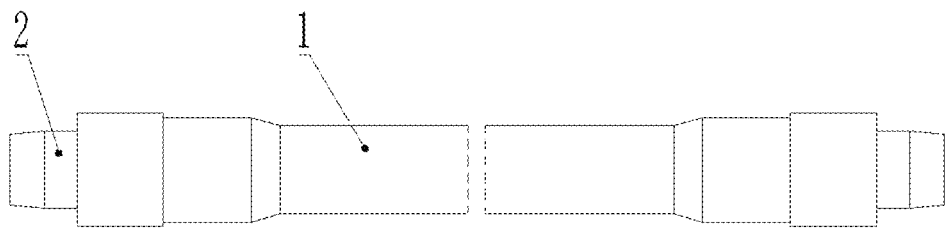
FIG. 1 is a schematic diagram of an outline of a hose assembly according to Example 1 of the present invention.

In the drawings: 1, Hose; 11, Inner liner layer; 12, Inner rubber layer; 13, Steel wire layer; 131, Steel wire; 14, Outer rubber layer; 15, Outer ply layer; 16, Inner ply layer; 2, Joint; 21, Protective sleeve; 211, Pyramidal frustum; 212, First externally threaded boss; 22, First locking sleeve; 221, First clamping boss; 222, First external boss; 223, Tooth groove; 224, Set screw; 23, Second locking sleeve; 231, Second externally threaded boss; 232, First sealing groove; 233, Second clamping boss; 24, Outer sleeve; 241, First internally threaded boss; 242, First internal boss; 2421, First filling cavity; 2422, First adhesive injection hole; 243, Second internal boss; 2431, Second filling cavity; 2432, Second adhesive injection hole; 244, Second internally threaded boss; 245, Fastening screw hole; 246, Second sealing groove; 247, Connecting thread; 248, Internal through hole; 25, Thermosetting resin; 26, Body flange; 27, Conversion connector; 28, Eye bolt; and 29, Flange clamp.

DETAILED DESCRIPTION

It should be pointed out that the following detailed descriptions are all illustrative and are intended to provide further descriptions of the present invention. Unless otherwise specified, all technical and scientific terms used in the present invention have meanings as those commonly understood by a person of ordinary skill in the technical field to which the present invention belongs. Furthermore, it should also be understood that the terms "comprise" and/or "include", when used in this specification, indicate the presence of features, steps, operations, devices, components and/or combinations thereof.

Example 1

As shown in FIG. 1, the present example provides a steel wire pre-embedded integrated full-bore acid fracturing hose assembly, including a hose 1 and a joint 2.

Figure 2:
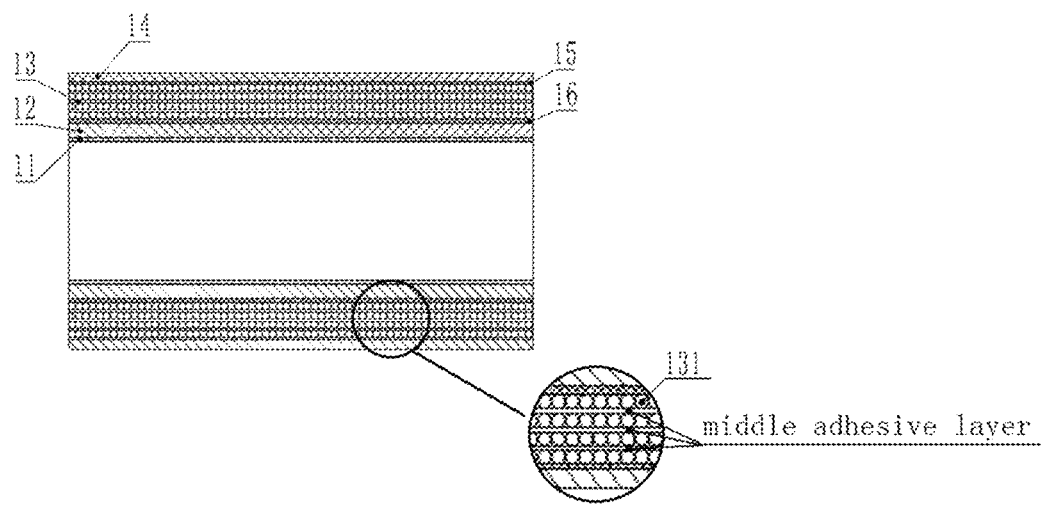
FIG. 2 is a schematic diagram of a hose according to Example 1 of the present invention.
Figure 3:
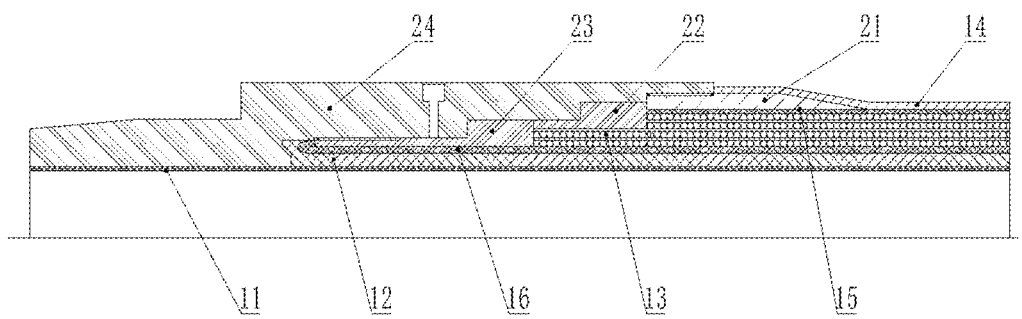
FIG. 3 is a schematic diagram of a hose fitted with a joint according to Example 1 of the present invention.

As shown in FIG. 2, the hose 1 sequentially includes an inner liner layer 11, an inner rubber layer 12, steel wire layer 13, and an outer rubber layer 14 from inside to outside. As shown in FIG. 3, the joint 2 includes a protective sleeve 21, a plurality of locking sleeves, and an outer sleeve 24 that are sequentially disposed from inside to outside along an axial direction of the hose 1.

The protective sleeve 21 is disposed between the outer rubber layer 14 and the steel wire layer 13; the locking sleeves is sleeved on an outer side of the inner rubber layer 12, an outer diameter of the locking sleeves is greater than an outer diameter of the steel wire layer 13, an inner end face of the locking sleeves abuts against an outer end face of the protective sleeve 21, an outer circumferential surface of the locking sleeves is provided with a plurality of tooth grooves 223, and steel wires 131 of the steel wire layer 13 is embedded in the tooth grooves 223 and locked; and the outer sleeve 24 is disposed outside the inner liner layer 11, and the outer sleeve 24 is in a threaded connection with the locking sleeves and the protective sleeve 21. The inner end and the outer end are relative to the axial direction of the hose 1, an end portion along the axial direction is the outer end, and a position inward along the axial direction is the inner end. In FIG. 3, a left side is the outer end, and a right side is the inner end.

In the hose assembly, the hose 1 and the joint 2 are integrally formed through vulcanization instead of buckle, to be in a full-bore form, and a flow rate is not limited. The protective sleeve 21 is located at the root of the joint 2 and is located between the outer rubber layer 14 and the steel wire layer 13 of the hose 1, and performs protection and support functions, to prevent the root connecting the hose 1 and the joint 2 from being excessively bent during use, avoid forming a stress concentration point, prevent the steel wire layer 13 from being deformed or damaged when stressed, and prolong the service life.

The outer sleeve 24 is in a threaded connection with the protective sleeve 21 and the locking sleeve, and then the outer rubber layer 14 is vulcanized to an outer side of the hose 1 and the protective sleeve 21. Through threaded connection and integral vulcanization, a close fit between the hose 1 and the joint 2 is implemented, thereby ensuring sealing and connection strength of the joint 2. In addition, the steel wires 131 of the steel wire layer 13 is firmly embedded in the tooth grooves 223 of the locking sleeve, and is further locked and fixed, thereby avoiding pull-out of the steel wires 131, combining the hose 1 and the joint 2 into a more compact whole, and improving connection strength and a pressure-bearing capability.

An inner layer of the hose 1 and an inner wall of the outer sleeve 24 share a continuous inner liner layer 11, so that the joint 2 that is difficult to be vulcanized on the inner side of the inner liner layer 11 is also protected by the inner liner layer 11, thereby improving performance such as resistance to wear and acid corrosion. In addition, there is no juncture and no weak point between the joint 2 and the hose 1, thereby ensuring sealing and integrity, and greatly prolonging the service life of the joint 2.

Further, an inner ply layer 16 is further disposed between the inner rubber layer 12 and the steel wire layer 13, an outer ply layer 15 is disposed between the steel wire layer 13 and the inner rubber layer 12, the second locking sleeve 23 is sleeved on an outer side of the inner ply layer 16, and the protective sleeve 21 is sleeved on an outer side of the outer ply layer 15. The multi-layer structure design enables the hose assembly to have better structural stability and pressure resistance, thereby providing better performance in an acid fracturing process.

Figure 4:
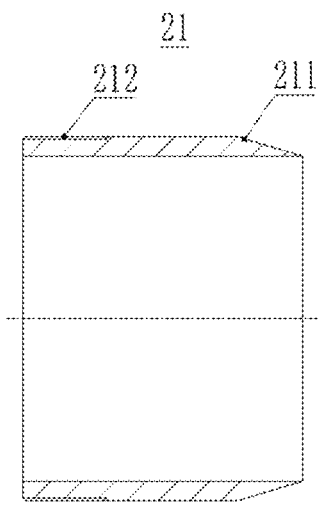
FIG. 4 is a schematic diagram of a protective sleeve according to Example 1 of the present invention.
Figure 11:
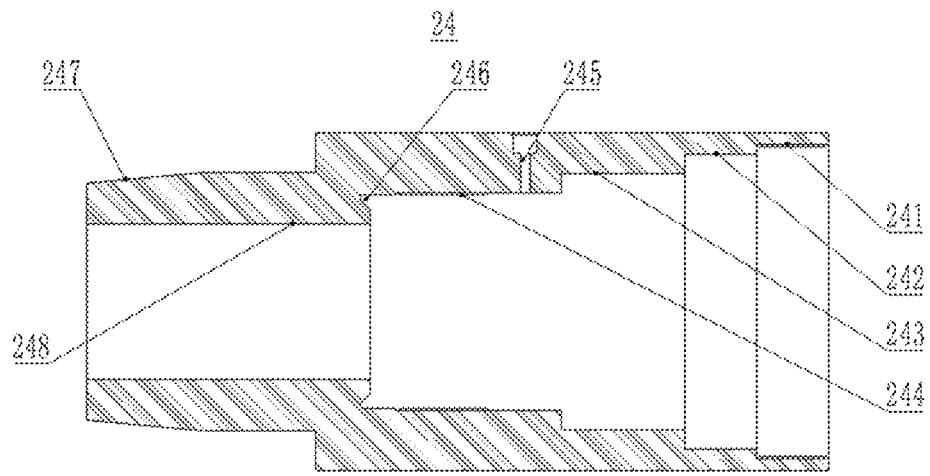
FIG. 11 is a schematic diagram of an outer sleeve according to Example 1 of the present invention.

As shown in FIG. 4, an outer circumferential surface of the protective sleeve 21 is axially provided with a pyramidal frustum 211, a conical frustum, and a first externally threaded boss 212 in sequence from right to left, a diameter of a large end of the pyramidal frustum 211 is equal to a diameter of the conical frustum and is equal to an outer diameter of the outer sleeve 24 (as shown in FIG. 3). As shown in FIG. 11, a right end portion of an inner hole of the outer sleeve 24 is provided with a first internally threaded boss 241, and the first externally threaded boss 212 of the protective sleeve 21 is connected to the first internally threaded boss 241 of the outer sleeve 24.

The tail of the protective sleeve 21 is a pyramidal frustum 211. The pyramidal frustum 211 may allow the outer rubber layer 14 is continuously and smoothly transition to the joint 2 when being coated with external adhesive. There is no stress concentration point, and the service life of the assembly is greatly prolonged. In addition, the locking sleeves are abutted by using the threaded connection between the protective sleeve 21 and the outer sleeve 24, to form a stable structure, thereby ensuring safety and reliability of the hose assembly in a high-pressure environment.

Figure 6:
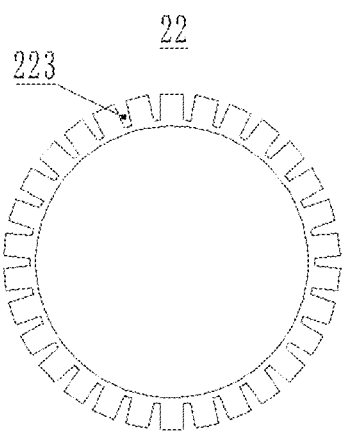
FIG. 6 is a side view of a first locking sleeve according to Example 1 of the present invention.
Figure 7:
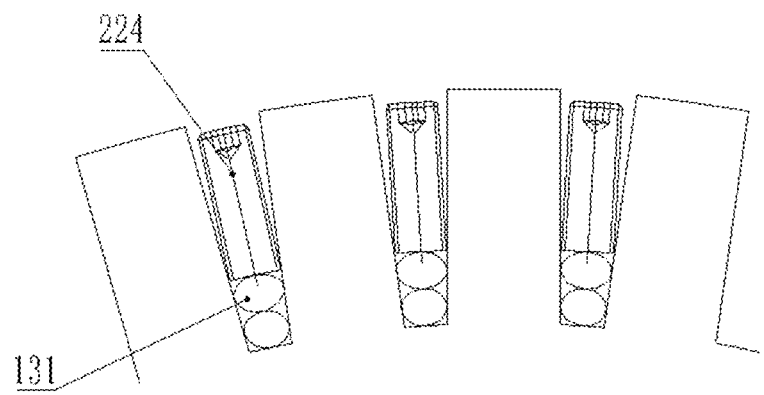
FIG. 7 is a schematic diagram of internal installation of a plurality of tooth grooves according to Example 1 of the present invention.
Figure 9:
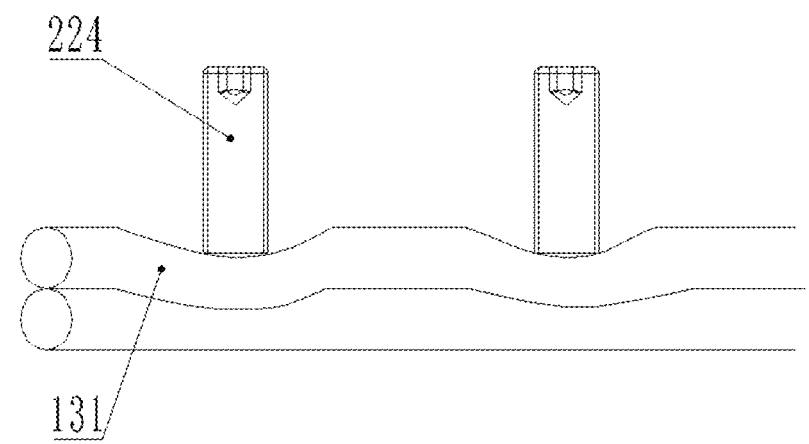
FIG. 9 is a schematic diagram of connection between a set screw and steel wires according to Example 1 of the present invention.

As shown in FIG. 2, the steel wire layer 13 includes a plurality of layers of steel wires 131 arranged radially. A middle adhesive layer is disposed between layers of the steel wires 131, to perform an adhesion function, so that the steel wire layer 13 is adhered to integrity. As shown in FIG. 6, the tooth grooves 223 is disposed in a circular array manner along a circle center of the locking sleeve, the tooth grooves 223 is arranged radially, two layers of steel wires 131 are installed radially in each tooth groove 223 (as shown in FIG. 7 and FIG. 9), and winding directions (that is, directions of rotation) of the two layers of steel wires 131 are opposite.

Two layers of the steel wires 131 are disposed in each tooth groove 223, and the two layers of the steel wires 131 have opposite directions of rotation. In this arrangement manner, two adjacent layers of the steel wires 131 can balance a torsional force when stressed, so that the torsional force can be balanced when the tube body is compressed, and stability and pressure-bearing capability of the hose assembly are further improved.

Figure 8:
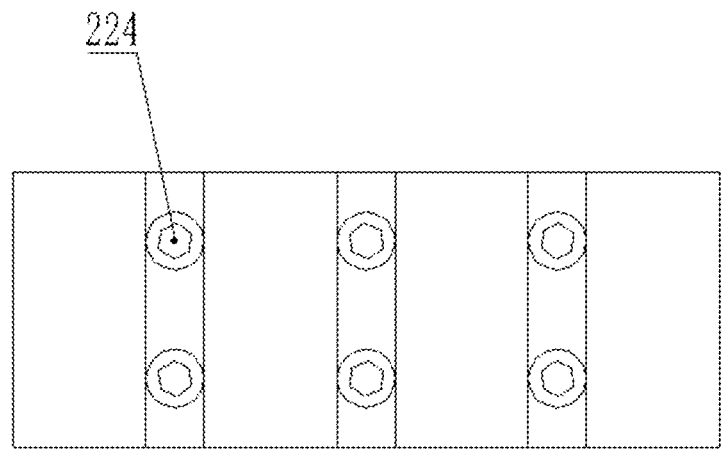
FIG. 8 is a top view of a set screw being installed in the plurality of the tooth grooves according to Example 1 of the present invention.

Further, the tooth grooves 223 is provided with a thread, the thread is arranged radially, the two layers of the steel wires 131 are disposed at a root of the tooth grooves 223, a set screw 224 (that is, a tightening screw) is installed in the thread of the tooth grooves 223, and the set screw 224 abuts against an outer side of the steel wires 131. As shown in FIG. 7 and FIG. 8, this design enables the steel wires 131 to be firmly locked in the tooth grooves 223, avoiding a pull-out phenomenon of the steel wires 131. In addition, a thread structure and the set screw 224 cooperate to further improve connection strength and reliability.

Figure 5:
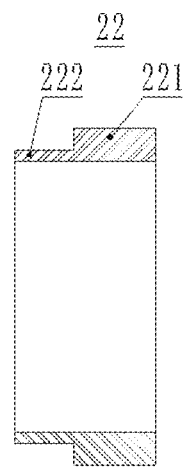
FIG. 5 is a section view of a first locking sleeve according to Example 1 of the present invention.
Figure 10:
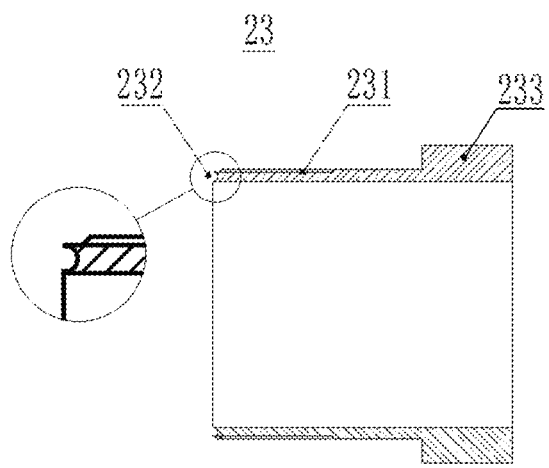
FIG. 10 is a schematic diagram of a second locking sleeve according to Example 1 of the present invention.

There may be a plurality of the locking sleeves. In the present example, the locking sleeves include a first locking sleeve 22 and a second locking sleeve 23, the first locking sleeve 22 is located at an inner end of the second locking sleeve 23, and the first locking sleeve 22 and the second locking sleeve 23 have a structure that is same as a structure of the tooth grooves 223 and that corresponds to a structure of four layers of the steel wires 131. As shown in FIG. 5, the first locking sleeve 22 is provided with a first clamping boss 221 and a first external boss 222. As shown in FIG. 10, the second locking sleeve 23 is provided with a second clamping boss 233 and a second externally threaded boss 231. As shown in FIG. 11, an outer end of an inner hole of the outer sleeve 24 is provided with an internal through hole 248, and a first internal boss 242, a second internal boss 243, and a second internally threaded boss 244 are sequentially disposed between the first internally threaded boss 241 and the internal through hole 248. As shown in FIG. 3, the first clamping boss 221 of the first locking sleeve 22 is matched with the first internal boss 242, the first external boss 222 of the first locking sleeve 22 and the second clamping boss 233 of the second locking sleeve 23 are matched with the second internal boss 243, and the second externally threaded boss 231 of the second locking sleeve 23 is matched with the second internally threaded boss 244.

The first locking sleeve 22 is used for locking two outer layers of the steel wires 131, and the second locking sleeve 23 locks two inner layers of the steel wires 131, to implement an anti-pull-out function. The second locking sleeve 23 is threaded on an outer side, and may be connected to the outer sleeve 24 as a whole. Further, due to connection between the protective sleeve 21 and the outer sleeve 24, the first locking sleeve 22 abuts against the second locking sleeve 23, to implement an overall reliable connection. In this way, the hose assembly can still maintain good sealing performance and structural stability in a high-pressure environment.

As shown in FIG. 10, an outer end portion of the second locking sleeve 23 is provided with a first sealing groove 232, the first sealing groove 232 is a concave arc. As shown in FIG. 11, a root of the second internally threaded boss 244 of the outer sleeve 24 is provided with a second sealing groove 246, the second sealing groove 246 is a concave inclined surface, and the inner rubber layer 12 and the inner ply layer 16 are clamped in a sealing cavity between the first sealing groove 232 and the second sealing groove 246 after being bent.

The design of the sealing structure enables the hose assembly to form an effective sealing at a connection part, thereby preventing leakage of a high-pressure liquid, improving sealing performance of the hose assembly, achieving a sealing effect when the tube body is compressed, and ensuring that the hose assembly can be safely and reliably operated in an acid fracturing process.

As shown in FIG. 11, the outer sleeve 24 is provided with a fastening screw hole 245 arranged radially, the fastening screw hole 245 extends through the second internally threaded boss 244, a fastening screw is installed in the fastening screw hole 245, and the fastening screw abuts against the second externally threaded boss 231 of the second locking sleeve 23. This design enables the outer sleeve 24 to be firmed fixed to the second locking sleeve 23 by using the fastening screw, to further improve connection strength and reliability of the hose assembly.

An outer end portion of the outer sleeve 24 is further provided with a connecting thread 247 for connection, which may be used to connect different forms of joints such as a flange and a union, and may also be directly changed into a union or flange structure, such as an integral union, a threaded union, a welded union, an integral flange, a welded flange, and the like. This design enables the outer sleeve 24 to be reliably connected to another device or component by using the connecting thread 247, thereby expanding an application range and connection flexibility of the hose assembly.

Example 2

Figure 12:
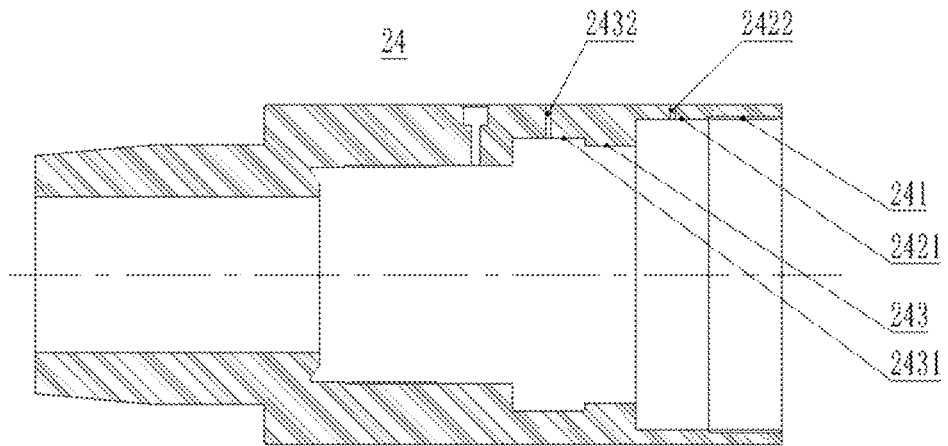
FIG. 12 is a schematic diagram of an outer sleeve according to Example 2 of the present invention.
Figure 13:
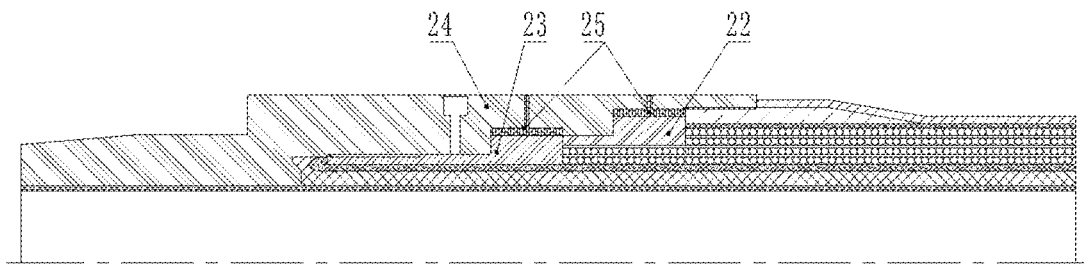
FIG. 13 is a schematic diagram of a hose fitted with a joint according to Example 2 of the present invention.

A difference between the present example and the Example 1 lies only in different outer sleeves 24. Specifically:

As shown in FIG. 12, the first internal boss 242 of the outer sleeve 24 is provided with a first filling cavity 2421, and a side wall of the outer sleeve 24 is provided with a first adhesive injection hole 2422 communicating with the first filling cavity 2421; and the second internal boss 243 of the outer sleeve 24 is provided with a second filling cavity 2431, and the side wall of the outer sleeve 24 is provided with a second adhesive injection hole 2432 communicating with the second filling cavity 2431. After the outer sleeve 24 is assembled, the filling cavity is infused with thermosetting resin 25 by using the adhesive injection hole, as shown in FIG. 13. After the resin is cool, a self-tapping screw is used to block the adhesive injection hole. In this manner, the thermosetting resin 25 may fill up each gap between teeth and between pressed screws, so that the whole outer sleeve 24 becomes solid. The steel wires 131 pressed by the screws and the screws have no movable space, so that the combination is more secure and can be used in higher pressure occasions with higher safety.

Example 3

A difference between the present example and the Example 1 lies only in different connection structures of an end portion of the joint 2. In the present example, the end portion of the joint 2 is a body flange 26, the body flange 26 is detachably connected to a conversion connector 27, and the conversion connector 27 is a union or a flange. The present example provides three types of specific structures.

Figure 14:
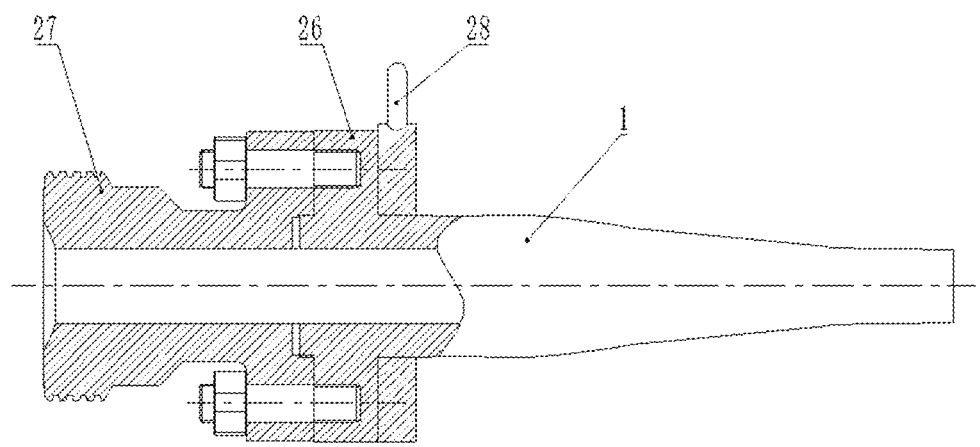
FIG. 14 is a section view of a first connection manner of an end portion of a joint according to Example 3 of the present invention.

A first type of connection structure is shown in FIG. 14. The body flange 26 is a flange plate with the hose 1, and the flange plate is provided with a screw hole which is not completely drilled for assembling a connecting stud. An end face of the flange plate is provided with a sealing ring installation groove. A right side of the conversion connector 27 is a flange with through holes, and the flange is provided with a circle of through holes, to be connected to the body flange 26 by using a stud. A left side of the conversion connector 27 may be designed as a male union, a female union, or a flange as required. An eye bolt 28 is used for installing a security link, and may be selected according to a customer requirement.

During assembly, the conversion connector 27 is first aligned with an end face of the body flange 26, the studs are all assembled to the body flange 26 and are screwed, and then tight nuts are screwed by using a torque wrench. The nuts are installed in opposite directions, and the assembly is completed. When another connection form is required, or the conversion connector 27 is damaged and fails, the nuts may be loosened and replaced.

Figure 15:
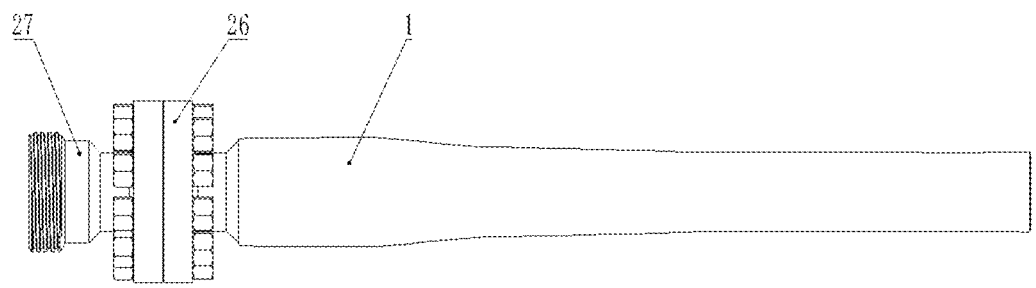
FIG. 15 is a front view of a second connection manner of an end portion of a joint according to Example 3 of the present invention.
Figure 16:
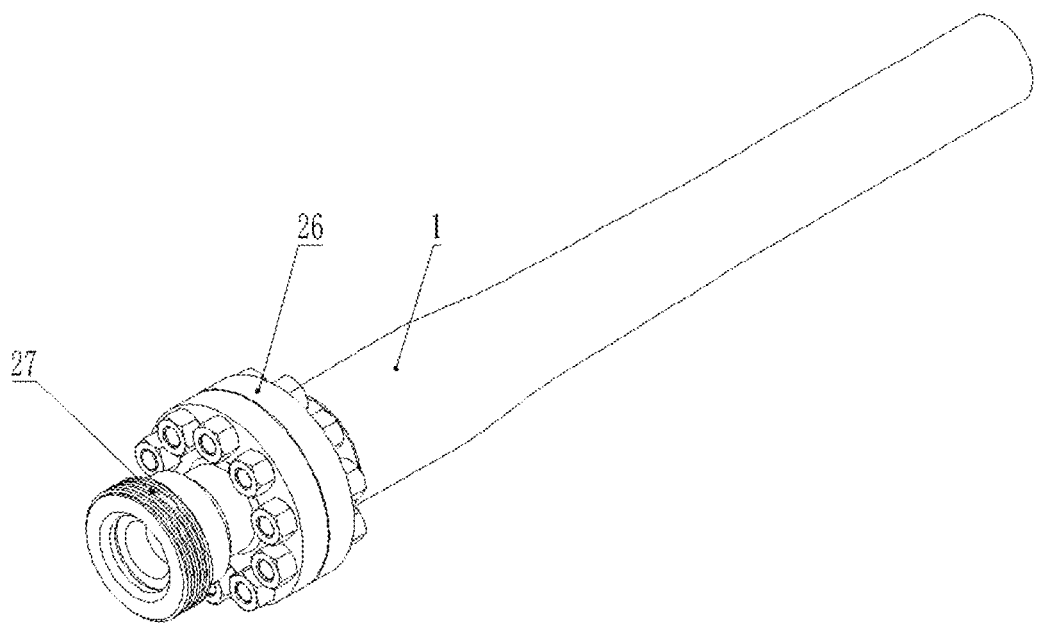
FIG. 16 is a space diagram of a second connection manner of an end portion of a joint according to Example 3 of the present invention.

A second type of connection structure is shown in FIG. 15 and FIG. 16. In this connection manner, a threaded blind hole on the first type of body flange 26 is changed to be in a through-hole structure, to be connected to the conversion connector 27 by using a stud. Nuts are used on outer sides of the two flanges, to connect the two flanges. When another connection form is required, or the conversion connector 27 is damaged and fails, the nuts may be loosened and replaced.

Figure 17:
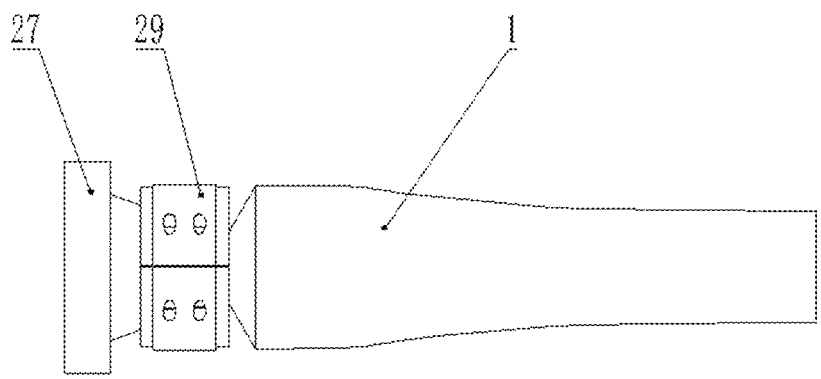
FIG. 17 is a front view of a third connection manner of an end portion of a joint according to Example 3 of the present invention.
Figure 18:
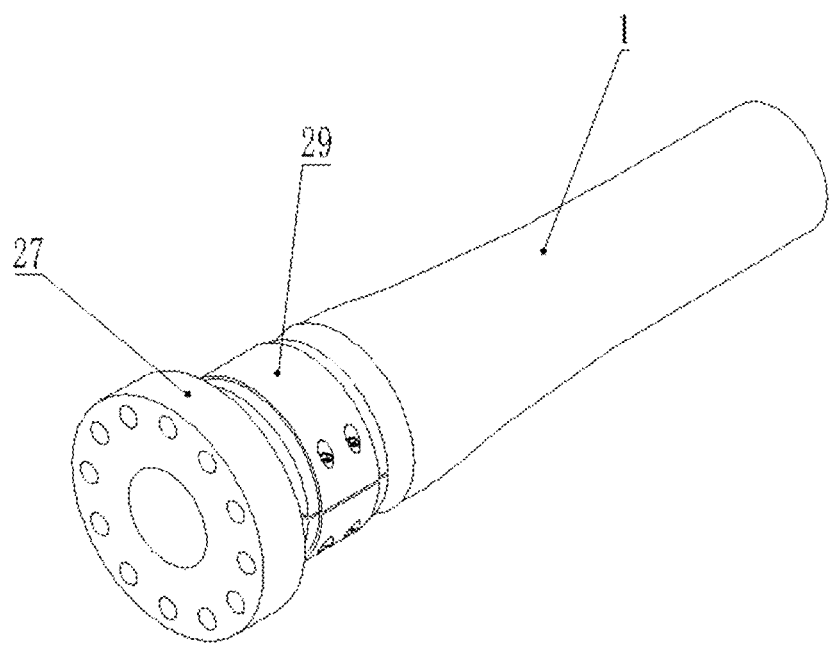
FIG. 18 is a space diagram of a third connection manner of an end portion of a joint according to Example 3 of the present invention.

A third type of connection structure is shown in FIG. 16 and FIG. 17. In this connection manner, connection is implemented by using a flange clamp 29. A body flange 26 is on a right side of the flange clamp 29, and a conversion connector 27 is on a left side. Likewise, a male union, a female union, or a flange may be on a left side of the conversion connector 27. During assembly, the two flanges are aligned in face, the flange clamp 29 is installed on an outer side, and bolts on the flange clamp 29 are tightened to connect the body flange 26 with the conversion connector 27. When another connection form is required, or the conversion connector 27 is damaged and fails, the bolts on the flange clamp 29 may be loosened and replaced.

In the present example, a detachable connection mechanism is used. When assemblies of different connection forms are required, only the conversion connector 27 at the end portion needs to be disassembled for replacement. In this way, one assembly can be used for a plurality of purposes with no need to prepare a plurality of assemblies of different connection forms. In addition, when the end portion conversion connector 27 fails but the tube body does not fail after being used for a period of time, the end portion conversion connector 27 may be disassembled and replaced with a new end portion conversion connector 27 without replacing an entire assembly, which can greatly reduce use costs.

Example 4

Figure 19:
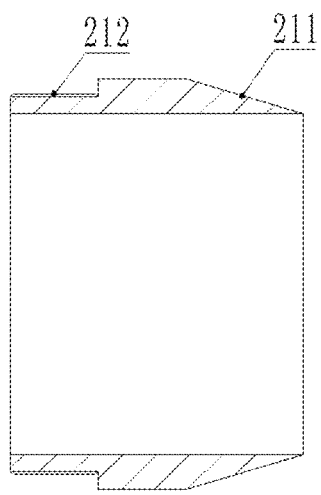
FIG. 19 is a schematic diagram of a protective sleeve according to Example 4 of the present invention.
Figure 20:
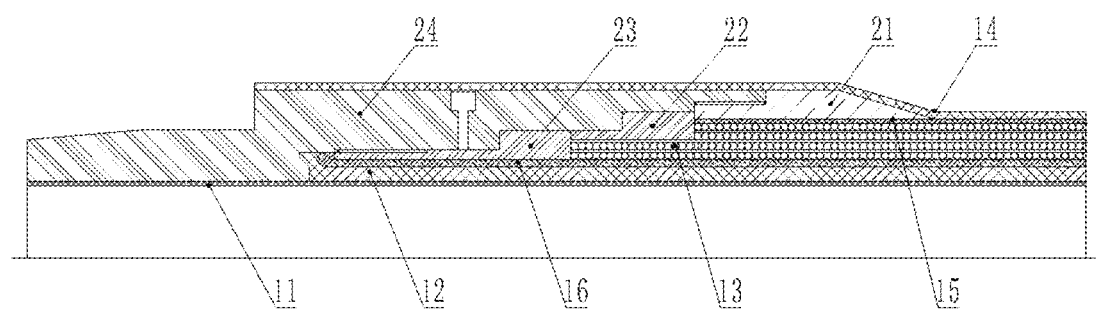
FIG. 20 is a schematic diagram of a hose fitted with a joint according to Example 4 of the present invention.
Figure 21:
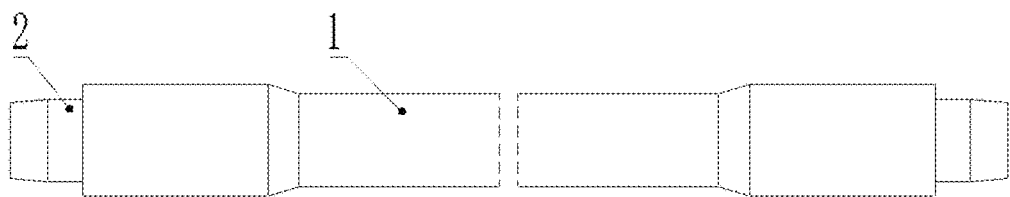
FIG. 21 is a schematic diagram of an outline of a hose assembly according to Example 4 of the present invention.

A difference between the present example and the Example 1 lies only in different coating lengths of the protective sleeve and the outer rubber layer.
Specifically:

As shown in FIG. 19, FIG. 20, and FIG. 21, the steel wire pre-embedded integrated full-bore acid fracturing hose assembly includes a hose 1 and a joint 2.

The hose 1 sequentially includes an inner liner layer 11, an inner rubber layer 12, a steel wire layer 13, and an outer rubber layer 14 from inside to outside. The joint 2 includes a protective sleeve 21, a plurality of locking sleeves, and an outer sleeve 24 that are sequentially disposed from inside to outside along an axial direction of the hose 1.

The protective sleeve 21 is disposed between the outer rubber layer 14 and the steel wire layer 13. The locking sleeves is sleeved on an outer side of the inner rubber layer 12, an outer diameter of the locking sleeves is greater than an outer diameter of the steel wire layer 13, an inner end face of the locking sleeves abuts against an outer end face of the protective sleeve 21, an outer circumferential surface of the locking sleeves is provided with a plurality of tooth grooves 223, and steel wires 131 of the steel wire layer 13 is embedded in the tooth grooves 223 and locked. The outer sleeve 24 is disposed between the inner liner layer 11 and the outer rubber layer 14, and the outer sleeve 24 is in a threaded connection with the locking sleeves and the protective sleeve 21.

The outer sleeve 24 is in a threaded connection with the protective sleeve 21 and the locking sleeve, and then the outer rubber layer 14 is vulcanized to an outer side of the hose 1, the outer sleeve 24, and the protective sleeve 21. Through threaded connection and integral vulcanization, a close fit between the hose 1 and the joint 2 is implemented, thereby ensuring sealing and connection strength of the joint 2. In addition, the steel wires 131 of the steel wire layer 13 is firmly embedded in the tooth grooves 223 of the locking sleeve, and is further locked and fixed, thereby avoiding pull-out of the steel wires 131, combining the hose 1 and the joint 2 into a more compact whole, and improving connection strength and a pressure-bearing capability.

An outer circumferential surface of the protective sleeve 21 is axially provided with a pyramidal frustum 211, a conical frustum, and a first externally threaded boss 212 in sequence from right to left, a diameter of a large end of the pyramidal frustum 211 is equal to a diameter of the conical frustum and is equal to an outer diameter of the outer sleeve 24. A right end portion of an inner hole of the outer sleeve 24 is provided with a first internally threaded boss 241, and the first externally threaded boss 212 of the protective sleeve 21 is connected to the first internally threaded boss 241 of the outer sleeve 24.

Example 5

The present example provides a method for preparing a steel wire pre-embedded integrated full-bore acid fracturing hose assembly, including:

S100: preparing a hose 1 not including an outer rubber layer 14.

S110: spirally winding an ultra-high molecular weight polyethylene (UPE) film on a clean steel core rod, to form an inner liner layer 11.

S120: coating internal adhesive on an outside of the film by using an extruding machine or through film wrapping, to form an inner rubber layer 12.

S130: wrapping an inner ply layer 16 around the inner rubber layer 12 for 2 to 8 layers according to a requirement.

S140: wrapping a middle adhesive layer and the steel wires 131 around the inner ply layer 16 with a middle adhesive layer under each layer of the steel wires 131, and wrapping for 2 to 12 layers of the steel wires 131 according to a pressure requirement; wherein, in the present example, 4 layers of the steel wires 131 are used, and 1 to 3 middle adhesive layers are wrapped around a last layer of the steel wires 131, to form a steel wire layer 13.

S150: wrapping an outer ply layer 15 around the steel wire layer 13.

Figure 22:
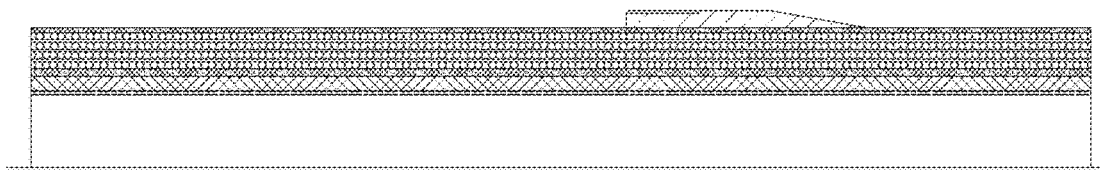
FIG. 22 is a schematic diagram of a state obtained after a protective sleeve is installed according to Example 5 of the present invention.

S200: as shown in FIG. 22, assembling a protective sleeve 21 to the hose 1 not including the outer rubber layer 14.

Figure 23:
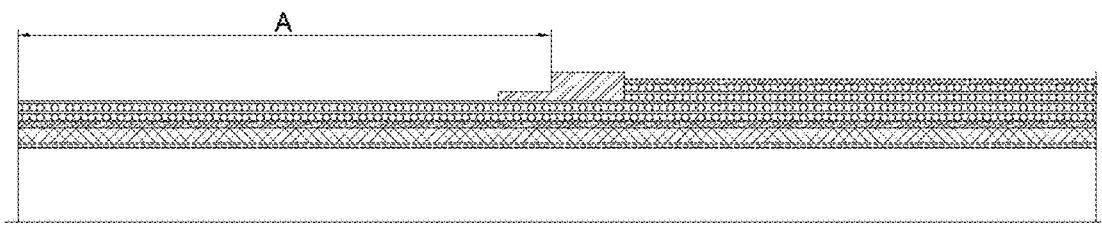
FIG. 23 is a schematic diagram of a state obtained after a first locking sleeve is installed according to Example 5 of the present invention.

S300: as shown in FIG. 23, cutting three or four layers (which are counted from the inside to the outside) of the steel wires 131 of a segment A by using a cutting machine, and binding a cutting part before cutting to avoid loose ends; after cutting the steel wires 131, assembling the first locking sleeve 22 to the hose 1; after spreading the steel wires 131, inserting each of the steel wires 131 into a plurality of tooth grooves 223 of the first locking sleeve 22, three layers of the steel wires 131 are on the lower part, and four layers of the steel wires 131 are on the upper part; providing two threaded holes in each tooth gap, and after tightening a set screw 224, pressing two steel wires 131 tightly. Because each the steel wires 131 is partially compressed, when the tube body is under pressure, a part that is not compressed cannot be separated from a compressed part, thereby implementing an anti-pull-out function. This process is a steel wire pre-embedded process. In this manner, the steel wires 131 can be locked without buckling the sleeve.

Figure 24:
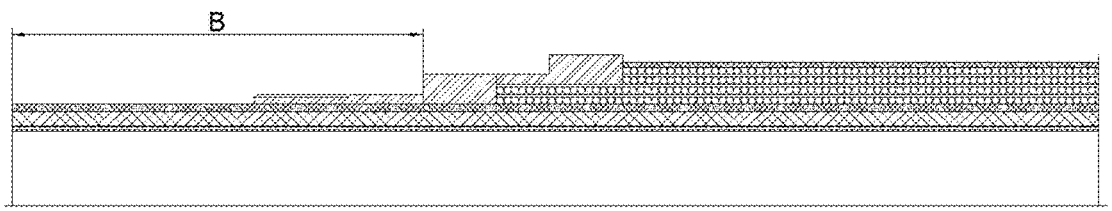
FIG. 24 is a schematic diagram of a state obtained after a second locking sleeve is installed according to Example 5 of the present invention.

S400: as shown in FIG. 24, cutting first and second layers of the steel wires 131 to a position of a section B, assembling a second locking sleeve 23, and spreading and pulling the first and second layers of the steel wires 131 into a plurality of tooth grooves 223 of the second locking sleeve 23 with the first layer of the steel wires 131 being on the lower part, and the second layer of the steel wires 131 being on the upper part, through an operation manner and a principle which are the same as those in step S300, tightening a set screw 224, and pressing the steel wires 131 tightly.

Figure 25:
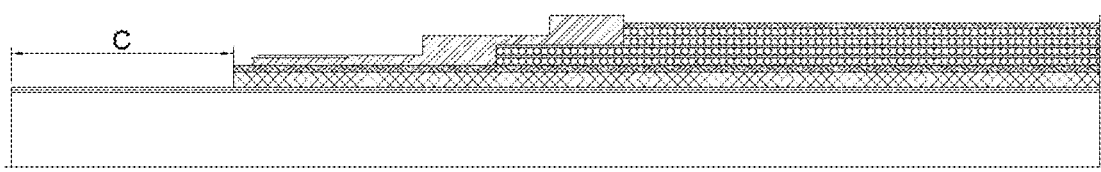
FIG. 25 is a schematic diagram of cutting an inner rubber layer and an inner ply layer according to Example 5 of the present invention.

S500: as shown in FIG. 25, stripping the inner ply layer 16 and the inner rubber layer 12 to a section C, remaining only a UPE inner liner layer 11, and everting the inner rubber layer 12 and the inner ply layer 16 at the end portion to a position of a sealing groove of the second locking sleeve 23.

Figure 26:
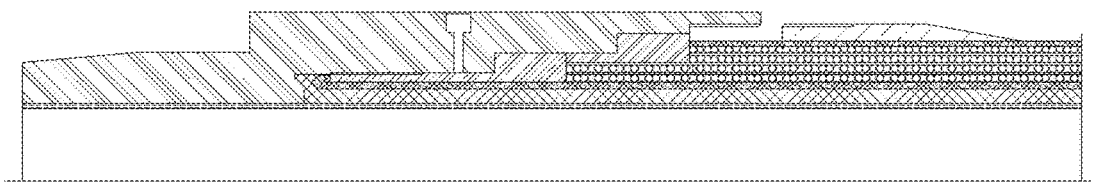
FIG. 26 is a schematic diagram of a state obtained after an outer sleeve is installed according to Example 5 of the present invention.

S600: as shown in FIG. 26, applying an inner wall part of an outer sleeve 24 with Chemlok® dedicated (Rubber to Metal) adhesive, for thermal vulcanization bonding between metal and the UPE inner liner layer 11; after being coated and assembled to the tube body, rotating the outer sleeve 24, to make the outer sleeve 24 mate with a thread of the second locking sleeve 23; after tightening, buckling a sealing groove inside the outer sleeve 24 with a sealing groove of the second locking sleeve 23, and compressing the everted inner rubber layer 12 and inner ply layer 16 to form a sealing cavity; after completing the assembly, screwing a fastening screw in a fastening screw hole 245, and applying a sealing adhesive to prevent the outer sleeve 24 from being rotated.

S700: assembling the protective sleeve 21 sleeved on the tube body in advance to the outer sleeve 24 through rotation, and after completing the assembly, the outer sleeve 24, the second locking sleeve 23, and the protective sleeve 21 are connected to be a stable whole, thereby implementing functions of assembly full-bore, steel wire pre-embedded, and no need to buckle.

S800: applying an outer surface of the outer sleeve 24 and an outer surface of the protective sleeve 21 with the Chemlok® adhesive, coating the outer ply layer 15 and a surface of the joint 2 with an outer rubber layer 14 after the applying is completed, wrapping with water cloth for vulcanization after the coating is completed, and obtaining a finished product after unwinding and coring. Through vulcanization, the outer sleeve 24 and the inner liner layer 11 are bonded into a whole, the outer rubber layer 14 and the protective sleeve 21 are bonded into a whole, and the inner rubber layer 12 and the inner ply layer 16 in the sealing cavity are vulcanized and shaped to be in a solid sealing structure. An inner layer of the rubber hose 1 and the inner wall of the joint 2 use a continuous lined UPE film, and the joint 2 is bonded with the UPE inner liner layer 11 by applying adhesive and thermal vulcanization. There is no seam and weak point, and UPE has excellent performance of resistance to wear and acid corrosion, to provide good performance and long service life in practical use.

The specific implementations of the present invention are described above with reference to the accompanying drawings, but not for limiting the protection scope of the present invention. It will be apparent to those skilled in the art that, based on the technical solutions of the present invention, various modifications or changes made by a person skilled in the art without creative efforts still fall within the protection scope of the present invention.

The invention claimed is:

1. A steel wire pre-embedded integrated full-bore acid fracturing hose assembly, comprising:
   a hose; and
   a joint; wherein,
   the hose comprises an inner liner layer, an inner rubber layer, an inner ply layer, a steel wire layer, an outer ply layer and an outer rubber layer from inside to outside; and
   the joint comprises:
      an outer sleeve,
      a plurality of locking sleeves, being disposed inside the outer sleeve, and
      a protective sleeve; wherein,
         a first portion of the protective sleeve is disposed inside and overlapped by the outer sleeve;
         a second portion of the protective sleeve is disposed between the outer rubber layer and the steel wire layer of an end portion of the hose connecting to the joint;
      the plurality of the locking sleeves are sleeved sequentially along a radial direction of the joint outside the inner ply layer of an inserting part of the end portion of the hose inserting into the joint,
      an outer diameter of one of the plurality of the locking sleeves is greater than an outer diameter of the steel wire layer,
      a first end face of the one of the plurality of the locking sleeves abuts against a first end face of the protective sleeve,
      an outer circumferential surface of each of the plurality of the locking sleeves is provided with tooth grooves, and steel wires in the steel wire layer are embedded and locked in the tooth grooves;
      the inner liner layer of the inserting part of the end portion of the hose is disposed to abut against an inner surface of a first end portion of an interior of the outer sleeve opposite to the hose, and the plurality of the locking sleeves and the protective sleeve are connected to the interior of the joint through threading;
      the tooth grooves are arranged radially on the outer circumferential surface of each of the plurality of the locking sleeves,
      the steel wires are installed radially in the tooth grooves of each of the plurality of the locking sleeves, and winding directions of the steel wires of two layers in the tooth grooves are opposite; and each of the tooth grooves is provided with a thread arranged radially, the steel wires of the two layers in the tooth grooves are placed at roots of the tooth grooves, wherein set screws installed in the threads of the tooth grooves abut against the steel wires of the two layers placed at the roots of the tooth grooves to fix the steel wires.

2. The steel wire pre-embedded integrated full-bore acid fracturing hose assembly according to claim 1, wherein an outer circumferential surface of the first portion of the protective sleeve is provided with a first externally threaded boss, and an outer circumferential surface of the second portion of the protective sleeve is provided with a pyramidal frustum;

the inner surface of a second end portion of the interior of the outer sleeve which abuts against the first portion of the protective sleeve is provided with a first internally threaded boss, and the first externally threaded boss and the first internally threaded boss are matched and connected to each other.

3. The steel wire pre-embedded integrated full-bore acid fracturing hose assembly according to claim 2, wherein the plurality of the locking sleeves comprise a first locking sleeve and a second locking sleeve, wherein, the first locking sleeve comprises a first clamping boss and a first external boss, the second locking sleeve comprises a second clamping boss and a second externally threaded boss, an internal through hole of the joint is provided along the first end portion of the interior of the outer sleeve overlapping the inner liner layer of the inserting part of the end portion of the hose, in the interior of the outer sleeve, a first internal boss, a second internal boss, and a second internally threaded boss are sequentially disposed from the first internally threaded boss to the internal through hole, wherein the first internal boss is configured to fit the first clamping boss of the first locking sleeve, the second internal boss is configured to fit the first external boss of the first locking sleeve and the second clamping boss of the second locking sleeve, and the second internally threaded boss is configured to fit the second externally threaded boss of the second locking sleeve.

4. The steel wire pre-embedded integrated full-bore acid fracturing hose assembly according to claim 3, wherein an end portion of the second externally threaded boss of the second locking sleeve is provided with a first sealing groove, the first sealing groove is provided to be a concave arc, a root of the second internally threaded boss of the outer sleeve is provided with a second sealing groove, the second sealing groove is provided to be a concave inclined surface, and the inner rubber layer of the inserting part of the end portion of the hose that is inserted into the joint is bent into and clamped between the first sealing groove and the second sealing groove; and the outer sleeve is provided with a fastening screw hole arranged radially, the fastening screw hole is disposed to extend through the second internally threaded boss, a fastening screw is installed in the fastening screw hole to abut against the second externally threaded boss of the second locking sleeve.

5. The steel wire pre-embedded integrated full-bore acid fracturing hose assembly according to claim 1, wherein an end portion of the joint distal to the hose is provided with a body flange, the body flange is configured to detachably connect to a conversion connector, and the conversion connector is a union or a flange.

\* \* \* \* \*